324-77 CROSS REFERENCE SEARCH ROOM
CHARACTER RECOGNITION SYSTEM
Filed Jan. 5, 1967
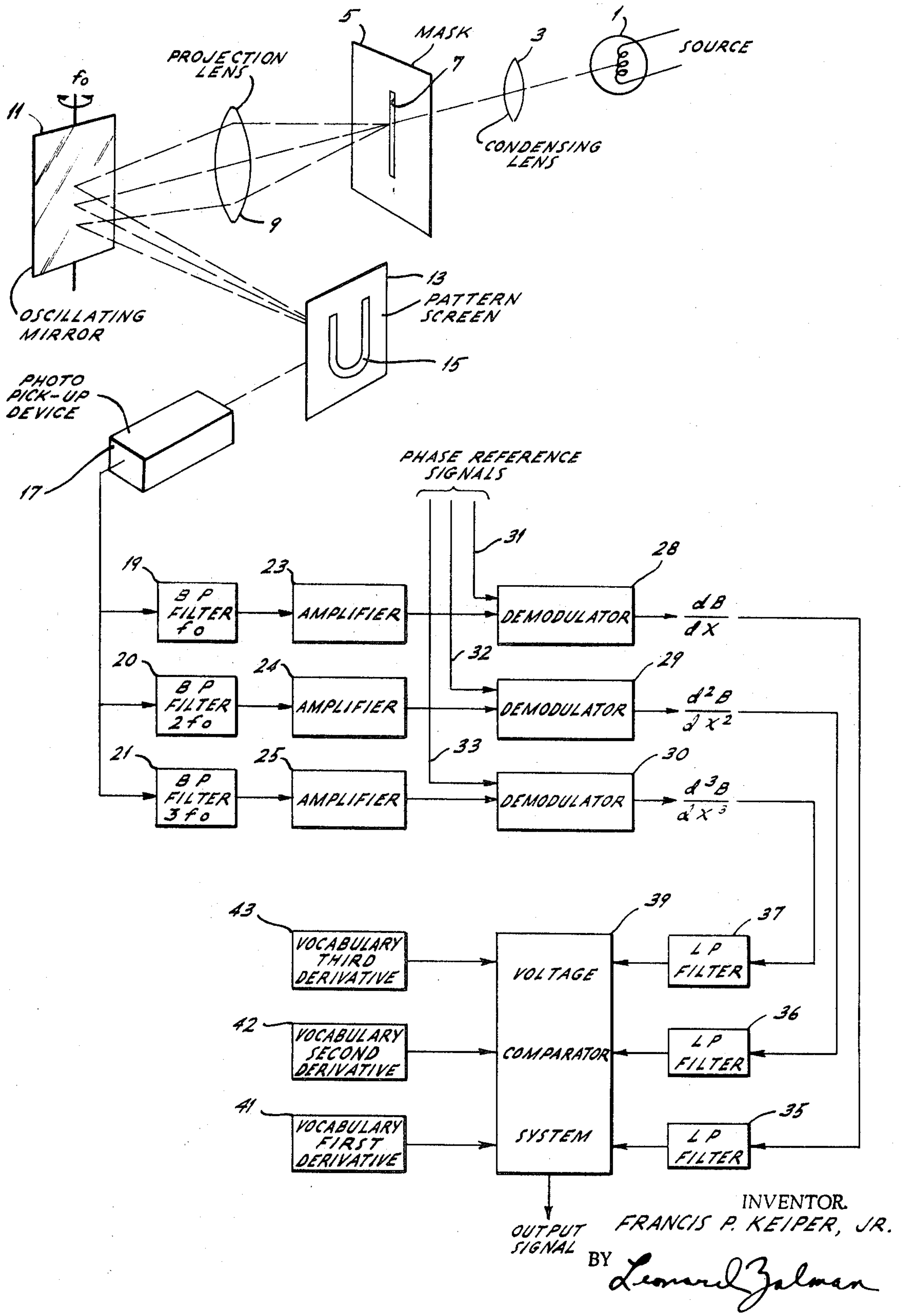
INVENTOR.
FRANCIS P. KEIPER, JR.
BY Leonard Zalman
AGENT United States Patent Office 3,534,333
Patented Oct. 13, 1970

3,534,333
CHARACTER RECOGNITION SYSTEM

Francis P. Keiper, Jr., Oreland, Pa., assignor to Philco-Ford Corporation, Philadelphia, Pa., a corporation of Delaware Filed Jan. 5, 1967, Ser. No. 607,505
Int. Cl. G06k 9/00
U.S. Cl. 340—146.3 8 Claims

ABSTRACT OF THE DISCLOSURE

A character recognition system in which the unknown character is identified by comparing a plurality of signals, respectively representative of different-order spatial derivatives of a light signal derived from the unkonwn character by oscillatory scansion thereof with a light beam of elongate cross section, with signals respectively representative of like-order derivatives of standard characters. In a preferred arrangement, a line-beam of light, long enough to span some portion of the unknown character which distinguishes it from other characters, is repeatedly scanned back and forth over that portion of the unknown character. The electrical signal produced by a photoelectric transducer responsive to the light reflected from the scanned area is supplied to the parallelled inputs of filters respectively having passbands at the scansion frequency and second and third harmonics thereof. The output signal of each filter is heterodyned in a demodulator with a phase reference signal of equal frequency. The output signal of the demodulator is passed through a low pass filter to recover the D-C component thereof, and the identity of the scanned character is ascertained by comparing the respective D-C components of the various demodulator output signals with corresponding standard D-C voltages stored in a vocabulary system.

Prior art methods of recognizing characters generally consist of line scanning the character to be "recognized." By proper processing of the electrical signal generated in response to the scanning, a signal can be developed which identifies the character scanned.

Although the character recognition systems of the prior art provide signals accurately representative of the character scanned, they have the drawback of requiring complex and costly line scanning and signal processing equipment.

Therefore, it is an object of the present invention to provide an improved character recognition system.

Another object of the present invention is to provide a character recognition system which does not require line scanning.

A still further object of the present invention is to provide a system which utilizes the waveforms of the different order derivatives of the electrical representation of the light deflected by scanned characters to distinguish between different characters.

According to the present invention, a scanning means having a width or height large enough to encompass a significant portion of one character is repeatedly swept over the character or characters to be "read" in a single horizontal or vertical motion. The electrical representation produced as a result of the scanning is processed to develop different order derivatives of the electrical representation.

The different order derivatives of the electrical representation are compared with corresponding order derivatives generated by scanning "known" characters. The comparison will show what character produced the particular waveforms for the different order derivatives and hence the character will be "read."

One preferred form of signal processing comprises heterodyning the various frequency components of the electrical representations with appropriately phased reference signals of the same frequency. The scanning of the character produces a waveform having a fundamental frequency corresponding to the frequency of scan and/or harmonics of the fundamental frequency. The fundamental frequency component of the electrical representation and each useful harmonic of the electrical representation are separated by appropriate filters and each is then beat with a phase reference signal in separate demodulators. The output of each demodulator is a waveform approximately equal to the waveform of a derivative of the electrical representation. A different order derivative appears at the output of each demodulator. The order of the derivative corresponds to the order of the harmonic of the electrical representation used as the input to the demodulator.

The above objects and other objects inherent in the present invention will become more apparent when read in conjunction with the following specification and drawing in which:

The figure is a block diagram of the improved charactor recognition method and apparatus of the present invention.

Referring to the figure there is shown a light source 1 which can be the ordinary incandescent type, a hydrogen arc, or the like. The output of light source 1 is focused by a condensing lens 3 onto an opaque mask 5. The mask 5 has a slit 7 formed therein which has a width small compared to the length. Slit 7 is shown as extending in a vertical direction. Alternatively slit 7 can extend in a horizontal direction or lie at any angle in the plane of the mask 5. Source 1, lens 3 and mask 5 cooperate to produce a flat beam of light. Other known means for forming such a flat beam may be substituted for the ones shown.

The light emanating through the slit 7 of mask 5 is focused by a projection lens 9 onto a reflecting surface 11.

In the particular embodiment shown in the figure, the reflecting surface 11 is a mirror. The mirror 11 is arranged to oscillate at a fixed frequency *fo* about an axis generally parallel to the longer dimension of slit 7. For a given position of the character to be "read," the oscillation frequency of the mirror 11 must be high enough to detect all the information concerning the character. The mirror oscillation frequency may be ultrasonic, for example the mirror surface might be a polished aluminized end of a piezoelectric crystal oscillating in a shear mode. Alternatively, a refractor (not shown) may be employed in place of mirror 11 with the light passing through and being variably refracted by the refractor. The index of refraction modulation of quartz would permit quartz to be used at megacycle frequencies.

The light reflected from the mirror 11 (or refracted by the refractor) is projected onto a pattern screen 13 having a character to be "read" indicated as 15. Pattern screen 13 may be a document carrying one or more characters to be recognized. Means (not shown) may be provided for shifting the position of the pattern screen or document relative to the area scanned by the light beam.

The vertical dimension of the slit 7 in mask 5 is chosen to be at least as large as a significant portion of the character 15. A significant portion of a character is that portion of the character which distinguishes it from other characters. For example, a significant portion of the letters R, B, and P is the lower half of these letters. In a vocabulary consisting of only these letters, only the lower half of these letters must be scanned to distinguish between them.

Due to the oscillations of mirror 11, the light reflected by mirror 11 is wobbled back and forth across the character 15. Light reflected by the screen 13 is detected by a photo pick-up device 17 located in proximity to the screen 13. The photo pick-up device 17 can be a photomultiplier containing electron multiplier stages and can have one or more lenses for focusing the light reflected by the screen 13.

The photo pick-up device 17 generates an electrical signal corresponding to the amount B of light reflected by screen 13. The electrical signal has a waveform dependent upon the particular character present on screen 13 and the position modulation of the light reflected by the mirror 11.

The output of the photo pick-up device 17 is connected to a plurality of frequency selective filters 19, 20, and 21. The frequency selective filters 19, 20, and 21 are bandpass filters and will pass frequencies corresponding, respectively, to the fundamental, second, and third harmonics of the mirror oscillation frequency. The outputs of the frequency selective filters 19, 20, and 21 are connected by way of amplifiers 23, 24, and 25, respectively, to the inputs of demodulators 28, 29, and 30, respectively.

A phase reference signal *fo*, which may be a sinusoidal signal having a frequency equal to the mirror oscillation frequency *fo* is also supplied by way of lead 31 as an input to the first demodulator 28. A first low pass filter 35 is connected to the output of demodulator 28. A second phase reference signal 2*fo*, which has a frequency twice that of *fo*, is supplied by way of lead 32 as an input to the second demodulator 29. A second low pass filter 36 is connected to the output of demodulator 29. A third phase reference signal 3*fo*, which has a frequency three times that of the signal *fo*, is supplied by way of lead 33 as an input to the trird demodulator 30. A third low pass filter 37 is connected to the output of demodulator 30.

As illustrated in the drawing, the low pass filters 35, 36, and 37 are connected to a voltage comparator system generally indicated as 39. The vocabulary for the voltage comparator system 39 is stored in vocabulary systems 41, 42, and 43. The systems 41, 42, and 43 store the first, second, and third derivatives, respectively, of the waveforms generated by scanning "known" characters. The voltage comparator network will produce an output signal identifying the character to be "read."

The function and operation of the system up to filters 19–21 is believed to be apparent from the foregoing description. The phase reference signal *fo* and the signal from the output of the amplifier 23 produce an output signal from the first low pass filter 35 having a D-C voltage component corresponding to the value of the D-C voltage component of the first derivative of the electrical representation of the light reflected by the screen 13. The phase reference signal 2*fo* and the signal from the output of the amplifier 24 produce an output signal from the second low pass filter 36 having a D-C voltage component corresponding to the value of the D-C voltage component of the second derivative of the electrical representation of the light reflected by the screen 13. The phase reference signal 3*fo* and the signal from the output of the amplifier 25 produce an output signal from the third low pass filter 37 having a D-C voltage component corresponding to the value of the D-C voltage component of the third derivative of the electrical representation of the light reflected by the screen 13.

For example, suppose that the character to be "read" is a U and that oscillation of mirror 11 produces sinusoidal (simple harmonic) scanning of the light beam across the character 15. As the light is deflected from the character center, light is absorbed by the character strokes proportional to the square of the displacement from center. That is, absorption of light A is equal to $Kx^2$, where $x$ is the displacement from center and K is a constant of proportionality. Since $x$ will vary according to the function cos $wt$ when the scanning means traverses the character sinusoidally, $$\frac{A}{K}=\cos^2 wt$$

By expanding $$\cos^2 wt \text{ we get } \frac{A}{K}=1/2+\frac{\cos 2wt}{2}$$

Since this signal has no fundamental component and no third harmonic component, the outputs of amplifiers 23 and 25, and hence the output of demodulators 28 and 30, will be zero. Since the expression for $A/K$ has a second harmonic component, the product of this second harmonic component and the phase reference signal, cos $2wt$, will appear at the output of demodulator 29. The product of $$\left(1/2+\frac{\cos 2wt}{2}\right)(\cos 2wt)$$

is $$\frac{\cos 2wt}{2}+1/2(\cos^2 2wt)$$

Since filter 36 will block all except the D-C voltage component of the waveform, the term $$\frac{\cos 2wt}{2}$$

can be disregarded. Expanding the term ½ (cos² 2wt), we get $$1/2\left(1/2+\frac{\cos 4wt}{2}\right)$$

as a result. The D-C voltage value of $A/K$ is ¼ which is a function of the correlation between the character scanned and the effective aperture generated by the slit motion and the second harmonic demodulation.

Assume now that a letter J is scanned which has the same shape as the letter U except that one arm of the U is shortened. The asymmetry of the J will introduce first and third harmonics in the signal picked up by device 17. Thus demodulators 28 and 30 will have output signals with at least one having a D-C component substantially different from zero.

Unknown characters are identified by scanning a vocabulary of "known" characters, storing the D-C voltage levels of the spatial derivatives in the output waveforms generated by scanning the "known" characters in a memory system represented by blocks 41–43, scanning the character to be "read" and comparing in system 39 the D-C voltage values of corresponding spatial derivatives in the waveform generated by scanning the character to be "read" with those stored in the memory. The circuit of the drawing shows only three signal processing channels for developing three signals from the scanning signal. However, more or less channels may be employed depending upon the number, complexity and dissimilarity of the characters to be "read."

The voltage comparator system may be a digital or analog computer having a memory corresponding to systems 41, 42, and 43. The type of computer used will depend upon the difference between the derivatives of the characters to be "read." If the differences between the derivatives are slight, a digital computer would produce the best results. If a digital computer is used the output signal may be a digital code provided in serial form on a single pair of conductors or different ones of a plurality of output conductors may be energized to represent different characters.

If the D-C voltage components representing the derivatives of the electrical representations generated by scanning the characters to be "read" do not differ sufficiently from character to character to enable the voltage comparator system to distinguish between them, the entire waveform, i.e. A-C and D-C components, of each derivative of each known character can be stored in the respective memory systems 41, 42, and 43 and the entire output of demodulators 28–30 compared with these stored waveforms. Such a system would require a much more complex signal comparison system 39.

Although the system of the present invention has been shown to include components of certain types and configurations, it will be apparent to one skilled in the art that various modifications can be made without departing from the scope of the present invention. For example, the reflecting surface 11 could be held stationary and the screen 13 oscillated at a given frequency. Also, a plurality of photo pick-up tubes can be used and the photo pick-up tubes could contain appropriate shading masks. Also screen 13, which has been assumed to be stationary, may move to bring new characters into the path of the scanning beam. The rate of movement should be such that there is little change in the area scanned in one period of oscillation of the mirror 11.

What I claim is:

1. In a character recognition system, first means for producing a beam of radiant energy having one dimension large enough to span a significant portion of a character to be recognized, second means for repeatedly passing said beam back and forth at a given frequency over said significant portion of said character, third means positioned to receive radiant energy of said beam from said significant portion of said character and responsive to said received radiant energy to produce an information signal, and fourth means, selectively responsive to time-varying components of said information signal which have respective different frequencies integrally related to said given frequency, to produce a plurality of output signals respectively representative of different-order derivatives of said information signal.

2. A system according to claim 1, additionally comprising fifth means, supplied with said output signals of said fourth means, for comparing each of said output signals, representative of a given-order derivative of said information signal, with different standard signals respectively representative of derivatives of said given order for different standard characters.

3. A system according to claim 1, in which said fourth means comprises:

means for supplying a plurality of phase reference signals having respective different frequencies substantially equal to said respective different frequencies of said time-varying components of said information signal, a plurality of heterodyning means, and means for supplying to each of said heterodyning means (a) a given one of said time-varying components other than those supplied to others of said heterodyning means and (b) that one of said phase reference signals having a frequency substantially equal to the frequency of said given one of said time-varying components.

4. A system according to claim 1, in which said fourth means comprises a plurality of band pass filter means, each supplied with said information signal and constructed selectively to transmit a given one of said time-varying components other than those of said time-varying components of which the others of said filter means are selectively transmissive.

5. A system according to claim 1, in which said first means comprises means for producing a beam of light having a cross section elongated sufficiently to permit said beam to span said significant portion of said character.

6. A system according to claim 1, in which:

said first means comprises means for producing a beam of light having a cross section elongated sufficiently to permit said beam to span said significant portion of said character, said second means comprises a mirror positioned to receive said elongated beam and arranged to be oscillated at said given frequency, said third means comprises photoelectric means positioned to receive light of said beam reflected by said character to be recognized, and said fourth means comprises a plurality of band pass filter means, each constructed selectively to transmit a given one of said time-varying components other than those of said time-varying components of which the others of said filter means are selectively transmissive; a plurality of heterodyning means; means for supplying a plurality of phase reference signals having respective different frequencies substantially equal to said respective different frequencies of said time-varying components of said information signal, and means for supplying to each of said heterodyning means (a) a selected one of said time-varying components other than those supplied to others of said heterodyning means and (b) that one of said phase reference signals having a frequency substantially equal to the frequency of said selected time-varying component.

7. A system according to claim 6, additionally comprising fifth means, supplied with said output signals of said fourth means, for comparing each of said output signals, representative of a derivative of given order of said information signal, with different standard signals respectively representative of derivatives of said given order for different standard characters.

8. A system according to claim 6, wherein said fourth means additionally comprises means supplied with said plurality of output signals for deriving therefrom their respective D-C components, and said system additionally comprises fifth means, supplied with said D-C components, for comparing each of said D-C components, corresponding to a given-order derivative of said information signal, with different standard D-C components respectively corresponding to derivatives of said given order for different standard characters.

References Cited

UNITED STATES PATENTS

| | | | |
|---|---|---|---|
| 2,968,789 | 1/1961 | Weiss et al. | 340—146.3 |
| 2,995,727 | 8/1961 | Quade | 340—146.3 |
| 3,426,325 | 2/1969 | Partin et al. | 340—146.3 |

OTHER REFERENCES

"Optical System for Character Recognition," by Goetz and Hajny, IBM Tech. Discl. Bulletin, vol. 6, No. 8, January 1964.

THOMAS A. ROBINSON, Primary Examiner

U.S. Cl. X.R.

324—77